US006886575B2

(12) United States Patent
Diamond

(10) Patent No.: US 6,886,575 B2
(45) Date of Patent: May 3, 2005

(54) LOCK RELEASE MECHANISM FOR FOLDABLE WALKERS

(75) Inventor: Harvey Diamond, Bedford, NY (US)

(73) Assignee: Medical Depot, Inc., Port Washington, NY (US)

( * ) Notice: Subject to any disclaimer, the term of this patent is extended or adjusted under 35 U.S.C. 154(b) by 64 days.

(21) Appl. No.: 10/397,972

(22) Filed: Mar. 25, 2003

(65) Prior Publication Data

US 2004/0187901 A1 Sep. 30, 2004

(51) Int. Cl.[7] .......................... A61H 3/00; A45B 9/00; F16B 1/04

(52) U.S. Cl. ...................... 135/74; 135/67; 403/322.4; 403/321

(58) Field of Search ................ 135/67, 74; 403/109.7, 403/109.8, 375.4, 322.4, 321

(56) References Cited

U.S. PATENT DOCUMENTS

| | | | | | |
|---|---|---|---|---|---|
| 2,796,916 | A | * | 6/1957 | Floy | 135/67 |
| 3,658,079 | A | | 4/1972 | Block | 135/45 |
| 3,688,789 | A | * | 9/1972 | Bunch | 135/67 |
| 3,690,652 | A | | 9/1972 | Schneider | 272/70.3 |
| 3,783,886 | A | * | 1/1974 | Thomas | 135/67 |
| 4,298,016 | A | | 11/1981 | Garelick | 135/67 |
| 4,461,471 | A | | 7/1984 | Brastow | 272/70.3 |
| 4,518,002 | A | | 5/1985 | Battiston, Sr. et al. | 135/67 |
| 4,640,301 | A | | 2/1987 | Battiston, Sr. et al. | 135/67 |
| 4,830,035 | A | | 5/1989 | Liu | 135/67 |
| 5,188,139 | A | | 2/1993 | Garelick | 135/67 |
| 5,201,333 | A | * | 4/1993 | Shalmon et al. | 135/67 |
| 5,255,696 | A | | 10/1993 | Leonard | 135/67 |
| 5,275,187 | A | * | 1/1994 | Davis | 135/67 |
| 5,433,235 | A | | 7/1995 | Miric et al. | 135/67 |
| 5,529,425 | A | * | 6/1996 | Spies et al. | 403/322.4 |
| 5,692,762 | A | | 12/1997 | Obitts | 280/87.05 |
| 5,862,825 | A | * | 1/1999 | Leonard | 135/67 |
| 6,279,591 | B1 | | 8/2001 | Obitts | 135/67 |
| D480,666 | S | | 10/2003 | Owens | D12/130 |
| 6,729,342 | B2 | * | 5/2004 | Serhan | 135/67 |

FOREIGN PATENT DOCUMENTS

| | | |
|---|---|---|
| GB | 919044 | 6/1961 |

* cited by examiner

*Primary Examiner*—Robert Canfield
(74) *Attorney, Agent, or Firm*—Wolff & Samson PC

(57) ABSTRACT

A locking assembly is disclosed for use with a walker having foldable side members. The locking assembly includes a locking pin movable between a first position in which the corresponding side member is held in a locked, unfolded state and a second position in which the side member is in an unlocked, folded state. A lock plate extends transversely to the longitudinal axis of the corresponding side member, and includes an aperture adapted to receive a locking end of the locking pin when the pin is in its first position. A lever is coupled to the locking pin such that when the lever is pivoted by upwardly applied pressure, the locking pin is moved from its first position to its second position to permit rotation of the corresponding side member to its folded state.

27 Claims, 2 Drawing Sheets

LOCK RELEASE MECHANISM FOR FOLDABLE WALKERS

BACKGROUND OF THE INVENTION

1. Technical Field of the Invention

This invention relates generally to a locking assembly, and more particularly to a locking assembly for use with a foldable walker.

2. Description of the Related Art

Prior art locking mechanisms used in connection with foldable walkers have suffered from various drawbacks. The drawbacks stem from the limited manual dexterity of handicapped people. For example, some prior art assemblies are operated through use of a lever. At least one of these devices requires the user of the walker to push down on the lever to allow for the walker to be folded. However, certain people with limited dexterity may be incapable of exerting enough downward force to activate such a lever and thus will be unable to operate the locking assembly. Also, the lever handles of the prior art are often narrow. This presents additional problems for users having diminished manual dexterity. The narrowness of the handle makes finding and gripping the lever difficult. This is particularly true for users having a debilitating disease affecting their fingers, such as rheumatoid arthritis.

Still other prior art locking assemblies for walkers utilize a pin actuating plunger located remotely from the handles of the walker. Often, these prior art pin actuating plungers are positioned on a cross brace away from a walker's handles. In this configuration, a handicapped person with limited dexterity is required to release his/her grip on the handles in order to operate the pin actuating plunger mounted on the cross brace. However, during the period in which the handicapped user has released the handle, the handicapped user is unbalanced, creating a greater likelihood that the user may fall. Moreover, by positioning the pin actuating plunger on a cross brace, the handicapped user with limited dexterity is required to use two hands in order to fold each side brace, e.g., using one hand to depress the plunger while the other hand folds in the side brace.

Based upon the foregoing, there is a need for a locking assembly for use with a foldable walker which is both economical to manufacture and relatively easy to operate by people with limited dexterity.

SUMMARY OF THE INVENTION

Embodiments of the present invention overcome the above-described shortcomings of prior foldable walkers and satisfy a significant need for a foldable walker that is relatively easy to configure between folded and unfolded positions by persons of limited dexterity. According to an exemplary embodiment of the present invention, a locking assembly is provided for use with a cylindrical member concentric with and rotatably mounted in a tubular member. The locking assembly may include a locking pin positioned parallel to a longitudinal axis of each of the two members and located external thereto. The locking pin is movable between a first position in which the two members are held in a locked state and a second position in which the members are in an unlocked state so that the two members are able to rotate in relation to each other. A lock plate is secured to one of the two members and extends transversely to the longitudinal axis thereof. The lock plate has an aperture adapted to receive a locking end of the locking pin when the pin is in the first position. A lever assembly is provided for moving the locking pin from its first position to its second position to permit rotation of the cylindrical member in relation to the tubular member. This lever assembly includes a housing member attached to another of the two members, and an actuating lever having a force-applying handle end and a housing attach end. A portion of the actuating lever is operatively connected to the locking pin. The housing attach end of the actuating lever is pivotally received by the housing member so that when an upward force is applied to the handle end, the actuating lever pivots with respect to the housing member and moves the locking pin to its second position thereby allowing the two members to be movable relative to each other.

According to another exemplary embodiment of the invention, a foldable walker is provided having a pair of side frames each of which has a substantially vertical front tubular leg. The foldable walker further includes a cross brace having a pair of substantially vertical end sleeves in which the tubular legs are concentrically contained so that the tubular legs are rotatable between a locked state and an unlocked state.

A locking assembly is also provided and is associated with each tubular leg. The locking assembly includes a first body portion having a first bore through which extends the tubular leg along a first longitudinal axis. A fastener rigidly connects the first body portion to the tubular leg, the fastener extending transversely to the first longitudinal axis and into both the first body portion and the tubular leg. A locking pin is movable between a first position in which the tubular leg and sleeve are in a locked state and a second position in which the tubular leg and sleeve are in an unlocked state. A second body portion rigidly connected to the first body portion has a second bore through which extends the locking pin along a second longitudinal axis wherein the first and second longitudinal axes are in relatively parallel position. A lock plate is rigidly connected to the end sleeve and extends transversely to the first and second longitudinal axes. The lock plate has an aperture which is adapted to receive a locking end of the locking pin when the locking pin is in its first position. To move the locking pin between its first and second positions, an actuating lever is provided which has a force applying handle end and a body attach end operatively connected to at least one of the first and second body portions. A portion of the actuator lever between the force applying handle end and the body attach end is coupled to the locking pin such that when an upward force is applied to the force applying handle end, the actuating lever pivots with respect to the body-portions and moves the locking pin from its first position to its second position, thereby allowing the tubular leg to be moved relative to the corresponding end sleeve.

Objects and advantages of the present invention will become apparent from reading the following description of the invention wherein reference is made to the accompanying drawings.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE EXEMPLARY EMBODIMENT

The present invention will now be described more fully hereinafter with reference to the accompanying drawings in which an exemplary embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
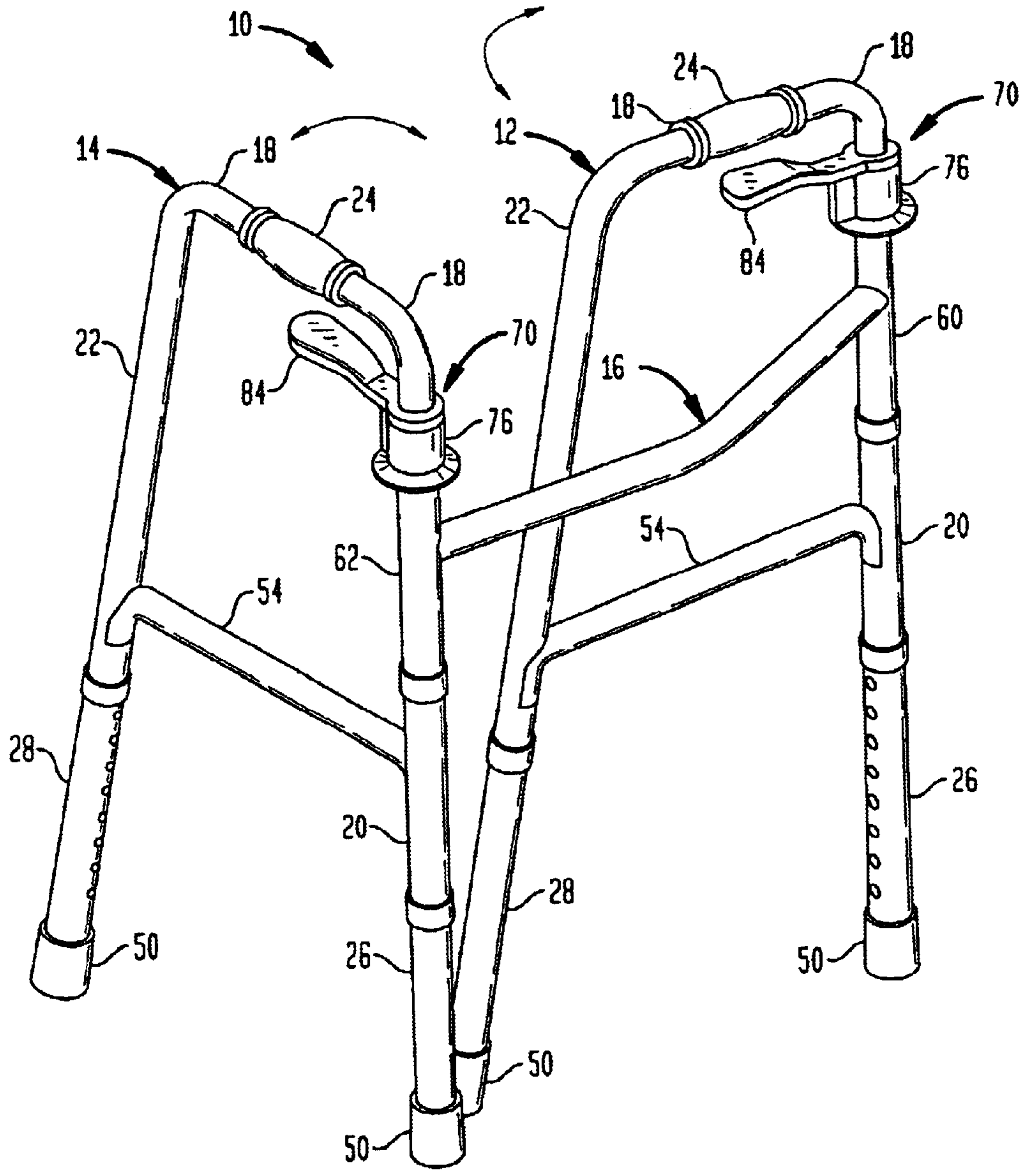
FIG. 1 a is a perspective view of a foldable walker with one side frame in its folded position and a second side frame in its unfolded position.

Referring now to the drawings wherein the showings are for purposes of illustrating an exemplary embodiment of the invention only and not for purposes of limiting same, FIG. 1 shows a walker 10 which includes a pair of spaced side frames 12 and 14 and a cross brace 16 for connecting the two side frames. Side frames 12 and 14, and cross brace 16 can be made from a lightweight and sturdy metallic material such as conventional aluminum or steel. Preferably, the metallic material of the side frames and cross brace is tubular in nature to reduce the weight of the walker. Since the right side frame 14 is identical to left side frame 12, the description of the two is identical. Thus only the left side frame 12 will be described in detail herein.

The left side frame 12 includes a top substantially horizontal support arm joining substantially vertical front and rear legs 20 and 22. A non-sliding hand grip 24 fits snugly around the horizontal support arm 18. The hand grip 24 is preferably formed from a suitable conventional polymeric material.

Releasably connected to the ends of the front and rear tubular legs 20 and 22 are front and rear telescoping tubular leg extensions 26 and 28, respectively. These telescoping extensions allow the walker to be adjusted in accordance with the height of the individual user. The telescoping extensions are connected to the legs using a snap button and corresponding biasing spring (not shown in the drawings). Because use of snap buttons and biasing springs to provide for walker legs having adjustable lengths is very well known in the art, details of the snap buttons and biasing springs will not be described for reasons of simplicity.

A crutch tip 50 is adapted to fit on the ground-engaging ends of the tubular leg extensions 26, 28 to prevent sliding movement between the walker 10 and the ground. In contrast to the metallic nature of the cross brace 16 and the side frames 12 and 14, crutch tips 50 are preferably made from a suitable conventional thermoplastic material.

A side brace 54 is connected between legs 20 and 22 of each side frame 12, 14. The side brace 54 reinforces the side frame 12 to prevent a spreading of the legs 20 and 22 of the walker 10 when the walker 10 is supporting the weight of the user.

The cross brace section 16 comprises a cross bar connected to a pair of substantially vertical end sleeves 60 and 62 which snugly embrace and surround intermediate portions of the front legs 20 of side frames 12 and 14, respectively.

For convenience of handling and storage, each side frame 12 and 14 may be folded inwardly relative to the cross brace 16 as shown in FIG. 1 with respect to side frame 12. Yet, to make the walker stable during use, the side frames 12 and 14 are required to be locked to the end sleeves 60 and 62, respectively, to prevent rotation when in the operative, open position as shown in FIG. 1 with respect to side frame 14.

Accordingly, a novel locking assembly 70 cooperates with each of the front legs 20 and its associated end sleeves 60, 62 to lock the walker in its operative position, as shown in FIG. 1 for side frame 14, or to enable the walker to be relatively easily folded into its folded, storage position, as shown in FIG. 1 for side frame 12. The locking assembly will be described only with respect to right side frame 14 and end sleeve 62. However, it should be appreciated that an identical locking assembly is provided for left side frame 12 and end sleeve 60.

Figure 2:
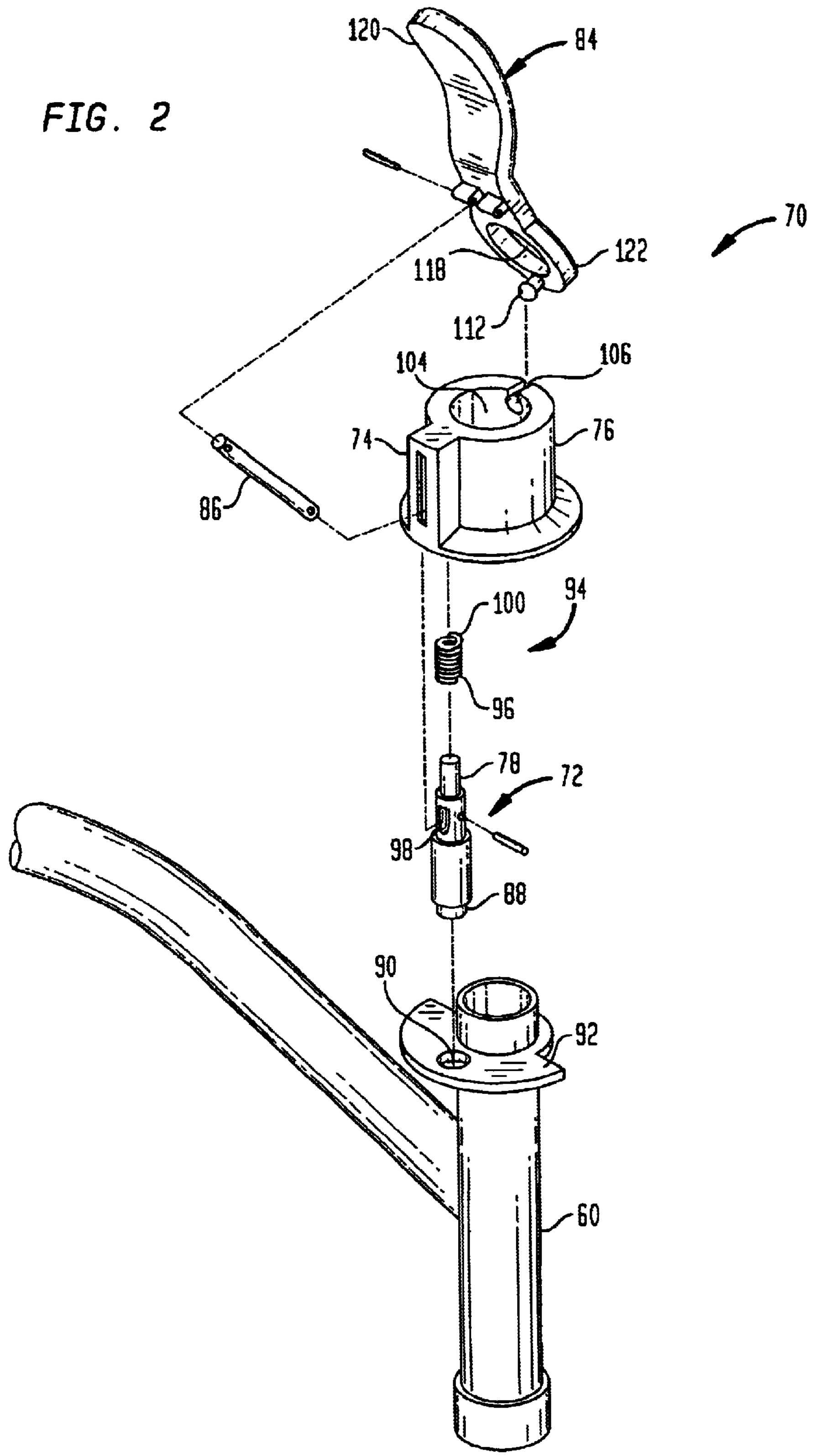
FIG. 2 is an enlarged exploded perspective view of the locking assembly portion for the foldable walker of FIG. 1.

FIG. 2 illustrates the locking assembly 70 in an exploded perspective form. The locking assembly 70 may include a locking pin 72 formed of a suitable metallic material extending through a pin bore 74 of a pin housing 76. A connecting rod 86 engages with a portion of locking pin 72 and is utilized to control the position of locking pin 72 within-pin bore 74. For example, connecting rod 86 engages with a portion of locking pin 72 somewhat proximal to end 78 thereof. It is understood that connecting rod 86 may engage with another portion of locking pin 72. In the exemplary embodiment shown in FIG. 2, connecting rod 86 is pivotally connected to locking pin 72.

A locking end 88 of locking pin 72 is adapted to snugly extend through an opening 90 of a lock plate 92 to lock front leg 20 and end sleeve 60 together and retain the walker in the operative, open position. It will be appreciated that the lock plate 92 is fixedly attached, such as by welding, to the outer periphery of end sleeve 60 and extends substantially normal thereto. A biasing spring 94 may surround some or all of the locking pin 72 within the pin bore 74. The spring has a first end 96 which may sit on a pin shoulder seat 98 and a second end 100 which abuts an inner shoulder of the pin bore 74. The biasing spring 94 normally urges the pin locking end 88 into the lock plate opening 90 when they are aligned as shown in FIG. 2.

The pin housing 76 is generally cylindrical having a longitudinal bore 104 extending therethrough and adapted to receive the front leg 20. Pin housing 76 may include a recess 106 defined along an upper edge of pin housing 76 and dimensioned to receive a pivot extension. Recess 106 cooperates with the pivot extension to provide a fulcrum about which an actuating lever 84 may rotate. Fasteners in the form of pop rivets (not shown) or the like may extend through pin housing 76 and the side frame so as to provide a rigid connection therebetween. It should be appreciated that the locking assembly prevents any upward sliding motion of the cross brace 16.

The actuating lever 84 may include pivot extension 112 that extends from a housing attach end 122 of actuating lever 84. Pivot extension 112 engages with recess 106 of pin housing 76 so as to provide a fulcrum of actuating lever 84, as described above. Pivot extension 112 may, for example, have a bulbous shape and be capable of movement within recess 106 so that actuating lever 84 is pivotally attached to pin housing 76. The actuating lever 84 may also have a transverse bore 118 which is aligned with the housing bore 104 to accommodate the front leg 20. The bore 118 is sized or otherwise configured to allow actuating lever rotation about the previously described fulcrum while the tubular front leg 20 is extended therethrough.

Connecting rod 86 may be connected between actuating lever 84 and locking pin 72. An end of connecting rod 86 may be pivotally attached to a portion of actuating lever 84 between handle portion 120 and housing attach end 122 of actuating lever 84. To unlock front leg 20 from end sleeve 60, locking pin 72 must be pulled upwardly so that the locking end 88 thereof is completely removed from the lock plate opening 90. This action is accomplished by conveniently and efficiently pulling upwardly, using finger-applied pressure, on handle portion 120 of the actuating lever 84. This, in turn, causes connecting rod 86 to be pulled in a substantially upward direction so as to raise the locking pin 72 within pin bore 74. Once the locking pin 72 is completely withdrawn from the lock plate opening 90, front leg 20 may then be rotated by the patient using hand-applied pressure onto hand grip 24 of the side frame 14 until the side frame 14 is in the folded position. In this way, the right side frame 14 can be folded substantially against the cross brace 16, since the locking end 88 of locking pin 72 will merely slide over the flat surface of the lock plate 92 and not be fixed thereto.

As illustrated in FIG. 1, the handle portion 120 of actuating lever 84 extends beneath hand grip 24. Because of the proximity between the handle portion 120 and hand grip 24, a handicapped user need only to extend one or more of his/her fingers so as to engage with the handle portion 120 while the palm and thumb of the same hand continue to engage with the hand grip 24. During this time, the user of the walker may continue to use the walker as a support device and will be less likely to lose his/her balance when folding the walker. When the handle portion 120 is manipulated, the corresponding side frame may be folded inwardly while the user's hand continues to grasp the hand grip 24 of the side frame. In this way, the locking assembly 70 may be actuated and the corresponding side frame may be placed in the folding position without the user having to release his/her grip on hand grip 24.

Thus, it is very easy and convenient for the handicapped person to release the locking pins 72 and rotate the side frames 12 and 14 from their open operable positions to their folded storage positions. The folded walker can easily be unfolded by rotating the side frames 12, 14 outwardly until the respective locking pin 72 snaps into the respective lock plate opening 90.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A locking assembly for use with a first member concentric with and rotatably mounted in a tubular second member, said locking assembly comprising:

a locking pin positioned substantially parallel to a longitudinal axis of each of said first and second members and located external thereto, said locking pin being movable between a first position in which said first and second members are held in a locked state and a second position in which said members are in an unlocked state such that said first and second members are able to rotate in relation to each other;

a lock plate secured to one of said first and second members and extending transversely to the longitudinal axes thereof, said lock plate having an aperture adapted to receive a locking end of said locking pin when said pin is in its first position; and a lever assembly for moving the locking pin from its first position to its second position to permit rotation of said first member in relation to said second member, said lever assembly including:

a housing attached to another of said first and second members to which said lock plate is not secured, and an actuating lever having a force-applying handle end and a housing attaching end operatively connected to said housing, a portion of the actuating lever between the force-applying handle end and the housing attaching end being coupled to said locking pin such that when an upward force is applied to the handle end of said actuating lever, said actuating lever pivots with respect to said housing and moves said locking pin from the first position to the second position so as to allow said first and second members to be rotatable relative to each other.

2. The locking assembly according to claim 1, wherein the housing includes a first body portion having a first bore through which extends the first member, and a second body portion having a second bore through which extends the locking pin.

3. The locking assembly according to claim 2, further comprising a spring for biasing said locking pin towards said first position, said spring adapted to be received in a said second bore and having a first end operatively engaging said locking pin and a second end operatively engaging a shoulder seat in said second bore.

4. The locking assembly according to claim 2, further comprising an elongated member coupled between the portion of said actuating lever and said locking pin.

5. The locking assembly according to claim 4, wherein the elongated member is pivotally attached to the portion of said actuating lever.

6. The locking assembly according to claim 4, wherein the elongated member is pivotally attached to said locking pin.

7. The locking assembly according to claim 2, wherein said actuating lever includes a third bore through which extends the first member wherein said first and third bores are substantially aligned.

8. The locking assembly according to claim 1, wherein the housing attaching end of the actuating lever includes a extension portion extending therefrom, and the housing includes a recessed portion dimensioned to receive the extension portion therein, the extension portion and the recessed portion providing a fulcrum about which the actuating lever pivots relative to the housing.

9. The locking assembly according to claim 8 wherein the extension portion includes a bulbous end received by the recessed portion of the housing.

10. A foldable walker comprising:

a pair of side frames each having a substantially vertical front leg and a substantially vertical rear leg;

a cross brace having a pair of substantially vertical end sleeves wherein each front leg is concentric with and held in a distinct one of said end sleeves so that said front legs are rotatable in relation to said cross brace between a locked state and an unlocked state;

a locking assembly associated with a front leg and corresponding end sleeve, said locking assembly comprising:

a housing secured to said front leg, a locking pin extending through a first bore in said housing, said locking pin being movable between a first position in which said front leg and end said sleeve are in the locked state and incapable of rotating in relation to each other and a second position in which said front leg and said end sleeve are in an unlocked state and capable of rotating in relation to each other;

a lock plate connected to said end sleeve and extending substantially transversely to the longitudinal axis thereof, said lock plate having an aperture adapted to receive a locking end of said locking pin when said locking pin is in the first position; and an actuating lever pivotally coupled to said housing, said lever having a force applying handle end and a housing attach end operatively connected to the housing, a portion of the actuating lever between the force applying handle end and the housing attach end being coupled to said locking pin, wherein a substantially upward force applied to the handle end pivots said actuating lever with respect to said housing member and moves said locking pin to its second position allowing said front leg to be rotated relative to the cross brace.

11. The foldable walker according to claim 10, wherein the housing includes a second bore through which extends the front leg, longitudinal axes of the first and second bores being substantially parallel to each other.

12. The foldable walker according to claim 10, further comprising a spring for biasing said locking pin towards said first position, said spring adapted to be received in a recessed portion of said first bore and having a first end operatively engaging said locking pin and a second end operatively engaging a shoulder seat of said recessed portion.

13. The foldable walker according to claim 10, further comprising an elongated member coupled between the portion of said actuating lever and said locking pin.

14. The foldable walker according to claim 13, wherein the elongated member is pivotally attached to the portion of the actuating lever.

15. The foldable walker according to claim 13, wherein the elongated member is pivotally attached to the locking pin.

16. The foldable walker according to claim 11, wherein the housing attach end of the actuating lever includes a third bore through which extends the leg, wherein said first and third bores are in alignment.

17. The foldable walker according to claim 10, wherein the housing attaching end of the actuating lever includes an extension portion extending therefrom, and the housing includes a recessed portion dimensioned to receive the extension portion, the extension portion and the recessed portion providing a fulcrum about which the actuating lever pivots relative to the housing.

18. The foldable walker according to claim 17, wherein the extension portion includes a bulbous end received by the recessed portion of the housing.

19. The foldable walker according to claim 10, wherein each side frame includes a substantially horizontal portion and a hand grip connected thereto, the force applying handle end of the actuating lever being disposed relative to the hand grip such that the upward force applied to the force applying handle end may be applied by one or more fingers of a user's hand while the palm and thumb of the hand engage with the hand grip.

20. A foldable walker, comprising:

a pair of side frames each having a substantially vertical front tubular leg;

a cross brace having a pair of substantially vertical end sleeves wherein said tubular legs are concentrically contained in said sleeves so that said tubular legs are rotatable between a locked state and an unlocked state; and a locking assembly associated with each tubular leg and corresponding end sleeve, each locking assembly comprising:

a first body portion having a first bore through which extends said tubular leg along a first longitudinal axis;

a locking pin movable between a first position in which said tubular leg and said sleeve are in the locked state and a second position in which said tubular leg and said sleeve are in the unlocked state;

a second body portion rigidly connected to said first body portion having a second bore through which extends the locking pin along a second longitudinal axis, said first and second longitudinal axes being in relative parallel position;

a lock plate rigidly connected to said sleeve and extending transversely to the first and second longitudinal axes, said lock plate having an aperture adapted to receive a locking end of said locking pin when said locking pin is in the first position; and an actuating lever having a force-applying handle end and a body attach end pivotally connected to at least one of the first and second body portions, a portion of the actuating lever being coupled to the locking pin such that when an upward force is applied to the force-applying handle end, said actuating lever pivots with respect to the at least one of the first and second body portions and moves said locking pin from the first position to the second position so that the tubular leg is capable of being moved relative to the corresponding end sleeve.

21. The foldable walker of claim 20, further comprising a spring disposed in the second bore for biasing said locking pin towards its first position.

22. The foldable walker of claim 20, further comprising a rod member connected between the portion of the actuating lever and the locking pin.

23. The foldable walker of claim 22, wherein the rod member is pivotally connected to the portion of the actuating lever.

24. The foldable walker of claim 22, wherein the rod member is pivotally connected to the locking pin.

25. The foldable walker of claim 20, wherein one of the body attach end of the actuating lever and the at least one of the first and second body portions includes an extension member and the other of the body attach end of the actuating lever and the at least one of the first and second body portions includes a recessed portion into which the extension member is received and to which the extension member is pivotally engaged.

26. The foldable walker of claim 25, wherein the body attach end of the actuating lever includes the extension member and the at least one of the first and second body portions includes the recessed portion.

27. The foldable walker of claim 25, wherein the extension member is bulbous.

* * * * *